Patented Dec. 28, 1937

2,103,749

UNITED STATES PATENT OFFICE 2,103,749

ACCELERATOR OF VULCANIZATION

William P. ter Horst, Silver Lake, Ohio, assignor to United States Rubber Company, New York, N. Y., a corporation of New Jersey No Drawing. Application September 28, 1933, Serial No. 691,354. Renewed June 10, 1937. In Canada July 3, 1933

11 Claims. (Cl. 18—53A)

This invention relates to the art of vulcanizing rubber, particularly, to the vulcanization of rubber in a short time and at low temperatures.

Rubber technologists have striven for years to reduce the time and the temperature of vulcanization, both for the purpose of producing a better quality of rubber and in order to increase the output of their vulcanizing equipment. With this end in view, numerous vulcanization accelerators have been developed, some of them being so active that vulcanization is complete in a few days at room temperatures or in a few minutes at temperatures above the boiling point of water. However, the accelerators which have heretofore been proposed, if sufficiently active to enable a substantial reduction in vulcanization time or temperature, are so active that the heat developed in the mixing or forming of the rubber composition is sufficient to institute vulcanizing, the composition being said to "scorch".

As is well known, the mercaptoarylenethiazoles; e. g., 1-mercaptobenzothiazole, are valuable rubber vulcanization accelerators, but they suffer from the defect of acting at a low temperature; so that when a rubber mix is made in the ordinary way by incorporating together the ingredients on the mill, there is a great risk that prevulcanization, or scorching, will take place unless special precautions are taken. Various efforts have been made to overcome this disadvantage. Thus it has been proposed to use a variety of different chemical derivatives of 1-mercaptoarylenethiazoles or to use a 1-mercaptoarylenethiazole in conjunction with acidic substances, but the results of all these efforts exhibit some defect.

This invention provides a method of vulcanizing rubber in a short time and/or at relatively low temperatures in the presence of accelerators having a tendency to produce pre-vulcanization, among them the mercaptoarylenethiazoles mentioned above, without giving rise to scorching during the mixing or other operations preliminary to vulcanization. It makes possible a new and improved method of vulcanization characterized by a freedom from pre-vulcanization, even in the presence of the mercaptoarylenethiazoles, and gives rise to vulcanized rubber compositions of good ageing and other properties.

Briefly stated, the invention involves the use as accelerators of vulcanization with or without other known accelerators of maleic or fumaric acid salts of amino bodies such, for example, as the amidines. Maleic and fumaric acids are isomeric, each having the formula $C_2H_2(COOH)_2$ and are therefore equivalent for the purpose. Maleic acid is known as the cis form and fumaric acid, as the trans form.

For purposes of illustration, the invention will be described with reference to the use, with 1-mercaptobenzothiazole and certain of its derivatives, of the guanidine and the substituted-ammonium salts of maleic and fumaric acids. Although in the practice of the invention these salts are preferably employed in conjunction with thiazyl sulphide accelerators, it will be understood that other known accelerators may be used in place of the thiazyl sulphides. Inasmuch as these salts are themselves accelerators, it will be understood that the use of accelerators other than the salts herein below described is not strictly necessary. It will also be understood that, in general, any amino-body salt of a maleic or fumaric acid which in the presence of zinc oxide and sulphur is unstable at vulcanization temperature is useful in the practice of the invention.

The materials of the present invention are well adapted to be used with 1-mercaptobenzothiazole or its derivatives. When so used, they speed vulcanization, but do not occasion the premature vulcanization in the mill caused by practically all free amines when used with 1-mercaptobenzothiazole. Moreover, the compounds of the invention enable 1-mercaptobenzothiazole to be used at higher vulcanization ranges, up to about 45 pounds of steam pressure. In one sense, the materials of the present invention may be said to have the effect of taming 1-mercaptobenzothiazole on the mill and activating it in the mold. The rubber after vulcanization has the so-called snappy quality of rubber obtainable under conditions of low temperature vulcanization.

While the invention is not to be understood to be limited by any theories expressed herein, it is believed that one reason for the excellent activating properties of the amino-body salts of maleic and fumaric acids is the ease with which they decompose at, or near, vulcanization temperatures. The amino-body salts of mono-carboxylic organic acids, as, for example, the diphenyl guanidine salts of stearic, acetic and benzoic acids, are relatively stable. They do not decompose readily and are thus inferior for the purposes of this invention to the amino-body salts of maleic and fumaric acids.

Example 1

What is believed to be diphenylguanidine maleate may be prepared by dissolving 116 parts of maleic acid in 500 parts of water, and adding to the solution, at a temperature of approximately 80 degrees C., 211 parts of diphenylguanidine. It is preferable to add the diphenylguanidine slowly and with stirring. The diphenylguanidine goes into solution, probably in the form of the acid maleate. The solution is then filtered to separate the small amount of water-insoluble material and the filtrate is allowed to cool. The product crystallizes out and after being filtered, washed and dried is obtained in a yield of 295 parts, melting at 138–140 degrees C.

The neutral diphenylguanidine maleate may be similarly prepared by adding 1 mol of diphenylguanidine to a solution of 1 mol of diphenylguanidine acid maleate in water. What is believed to be the neutral diphenylguanidine maleate separates out on cooling as a white powder.

*Example 2*

Diphenylguanidine neutral fumarate is prepared by heating 23.2 grams of fumaric acid and 84.4 grams of diphenylguanidine in 250 cc. of alcohol to the boiling point of the alcohol. After this solution is allowed to cool and to stand for a number of hours, a substantially colorless solid separates out. This solid diphenylguanidine neutral fumarate when pulverized and dried melts with decomposition at 193 degrees C. The yield is quantitative. The equation representing the reaction is believed to be as follows:

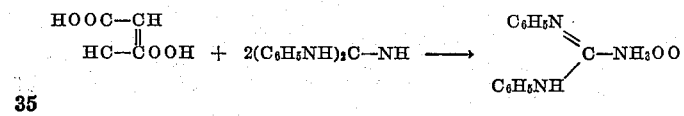

This diphenylguanidine neutral fumarate may be employed in substantially any rubber formula, the following being one which has been found to give excellent results:

| | Parts by weight |
|---|---|
| Smoked sheet rubber | 50 |
| Pale crepe rubber | 50 |
| Zinc oxide | 5 |
| Sulphur | 3 |
| Titanium dioxide | 10 |
| 1-mercaptobenzothiazole | 0.13 |
| Diphenylguanidine neutral fumarate | 0.25 |

The above rubber stock upon being cured for varying periods of time gave the following testing data:

| Cure in mins. at 260° F. | Ultimate tensile | Max. elong. in percentage | Modulus in kgs/cm² | |
|---|---|---|---|---|
| | | | 500% | 700% |
| 20 | 136 | 750 | 30 | 104 |
| 30 | 172 | 740 | 38 | 137 |
| 40 | 167 | 710 | 44 | 191 |
| 80 | 196 | 705 | 54 | ----- |

It is readily seen that the employment of diphenylguanidine fumarate in conjunction with mercaptobenzothiazole gives vulcanized rubber with very excellent characteristics. Scorch tests run on the stock containing diphenylguanidine fumarate in comparison with similar stocks containing mercaptobenzothiazole alone show the stock containing diphenylguanidine fumarate to be much less scorchy than a similar stock containing only mercaptobenzothiazole.

Instead of the 1-mercaptobenzothiazole previously mentioned as activated by the maleates and fumarates, other mercaptobenzothiazoles and disulphides thereof may be used with excellent results. Examples are 1-mercapto tolyl thiazole, 4- or 5-chloro 1-mercaptobenzothiazole, 4- or 5-nitro 1-mercaptobenzothiazole, nitro chlor 1-mercaptobenzothiazoles, dibenzothiazyl disulphide and others. The maleates and fumarates may also be used in admixtures or in combination with esters of the 1-mercaptobenzothiazoles as, for example, with the 2-4-dinitro phenyl ester, the benzoyl ester, the ethyl chloro carbonate ester or the chloro-acetone esters of 1-mercaptobenzothiazole or 5-nitro 1-mercaptobenzothiazole. The thiuram disulphides and dithiocarbamates may also be employed.

It is to be understood that any maleate or fumarate salt of an amino-body which is unstable at vulcanization temperature in the presence of zinc oxide and sulphur is useful in the practice of the invention. Other examples of maleates and fumarates of basic rubber accelerators are the diphenylguanidine-aniline-maleate, phenyl ortho tolyl guanidine maleates, di-ortho tolyl guanidine maleates, diphenyl guanidine urea-maleate, diphenylguanidine ammonium maleate. Still others are the phenyl ortho tolyl guanidine fumarates, diphenylguanidine-aniline fumarate, diphenylguanidine ammonium fumarate, diphenylguanidine-urea fumarate, the diortho tolyl guanidine fumarates.

Although it is believed that the reaction products of the amino-bodies and the maleic and fumaric acids are definite addition compounds, it will be understood that the exact constitution of the reaction products is not known with certainty.

It is also to be understood that the proportions of the thiazyl sulphide and the amino-body salt of the maleic or fumaric acid best suited for any particular rubber stock will preferably be determined by experimentation, although the desired proportions will generally be in the neighborhood of those illustrated herein; also, that mixtures of thiazyl sulphides may be used with a single amino-body salt. Similarly, a mixture of amino-body salts may be employed in conjunction with a single thiazyl sulphide. It is also to be understood that in some cases the amino-body and the maleic or fumaric acid, instead of being previously reacted, may be incorporated separately in the rubber with excellent results. Alternatively, the amino-body may be previously reacted, or mixed, with the thiazyl sulphide and the acid added separately. Generally, however, it will be desirable to take care in adding the acid to the rubber as some acids are difficult to uniformly disperse in rubber and others are decomposed at the ordinary processing temperatures. Again, if the rubber employed is in the form of an aqueous dispersion such as latex, it will usually be necessary to add the acid under such conditions as to prevent premature coagulation. While ordinary coagulated rubber of the *Hevea brasiliensis* tree is preferably employed, any other material of the rubber family, such as latex, balata, gutta percha, guayule and the like, may be used in the practice of the invention.

It is intended that the patent shall cover by suitable expression in the appended claims whatever features of patentable novelty reside in the invention.

What is claimed is:

1. The process of accelerating the vulcanization of rubber which comprises vulcanizing in the presence of an organic sulphur-containing accelerator and diphenylguanidine neutral maleate.

2. The process of accelerating the vulcanization of rubber which comprises vulcanizing in the presence of an aryl thiazyl sulphide accelerator and the neutral reaction product of diphenylguanidine and maleic acid.

3. The process of accelerating the vulcanization of rubber which comprises vulcanizing in the presence of a mercapto aryl thiazole accelerator and a diaryl guanidine neutral maleate.

4. The process of accelerating the vulcanization of rubber which comprises vulcanizing in the presence of mercaptobenzothiazole and a diaryl guanidine neutral maleate.

5. A rubber product that has been vulcanized in the presence of a mercapto aryl thiazole accelerator and a neutral reaction product of a maleic acid and diphenylguanidine.

6. A rubber product that has been vulcanized in the presence of 1-mercaptobenzothiazole and a neutral reaction product of a diaryl guanidine and maleic acid.

7. A rubber product that has been vulcanized in the presence of an ester of a mercaptobenzothiazole and a diaryl guanidine neutral maleate.

8. A rubber product that has been vulcanized in the presence of diphenylguanidine neutral maleate.

9. A rubber product that has been vulcanized in the presence of a diaryl guanidine neutral maleate.

10. A process of accelerating the vulcanization of rubber which comprises vulcanizing in the presence of diphenylguanidine neutral maleate.

11. A process of accelerating the vulcanization of rubber which comprises vulcanizing in the presence of a diaryl guanidine neutral maleate.

WILLIAM P. TER HORST.